(No Model.) 3 Sheets—Sheet 1.
H. LEMP & W. S. MOODY.
PROCESS OF ELECTRIC METAL WORKING.
No. 523,986. Patented Aug. 7, 1894.
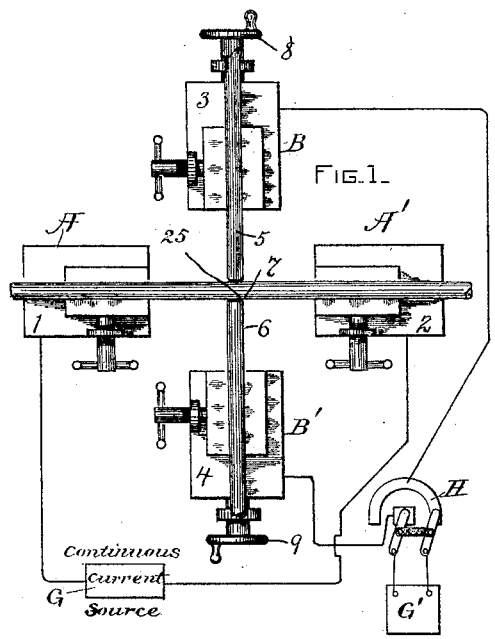
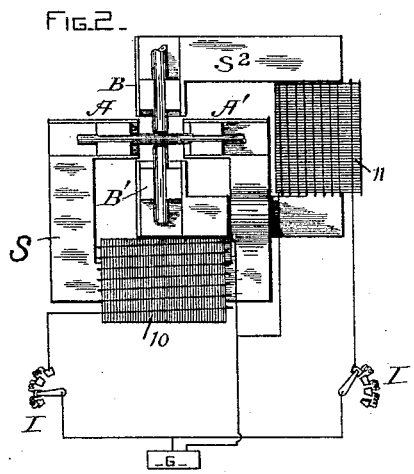
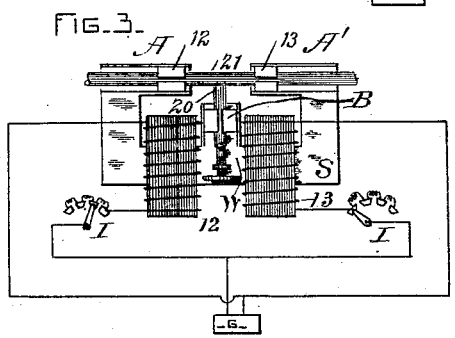
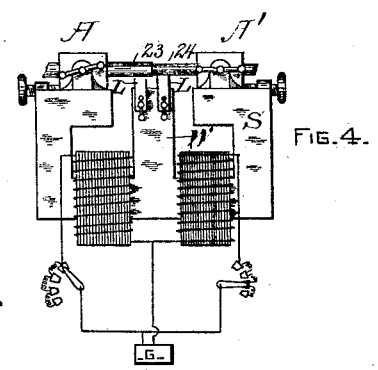
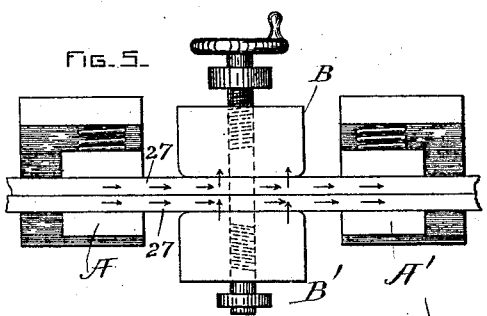
WITNESSES
Thos. F. Courey
Wm. H. Capel
INVENTORS
Hermann Lemp
Walter S. Moody
By H. C. Townsend
Atty.

(No Model.) 3 Sheets—Sheet 2.
H. LEMP & W. S. MOODY.
PROCESS OF ELECTRIC METAL WORKING.
No. 523,986. Patented Aug. 7, 1894.
Fig. 6.
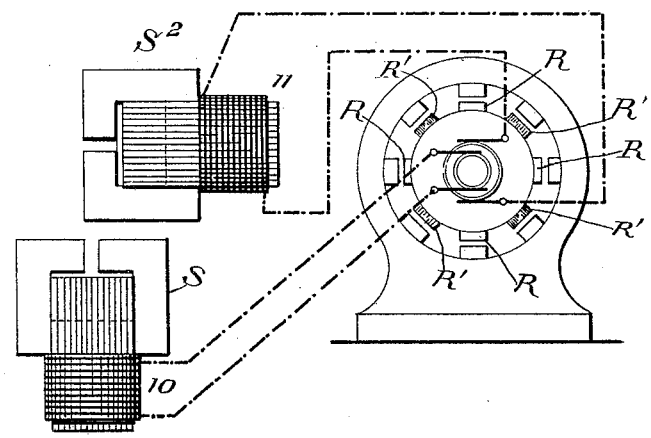
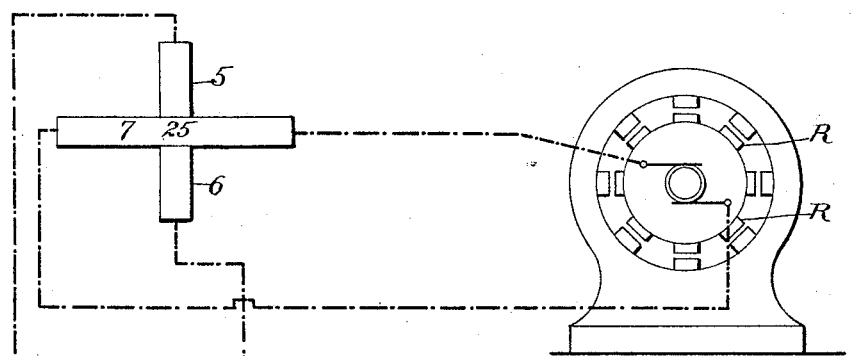
Fig. 7.
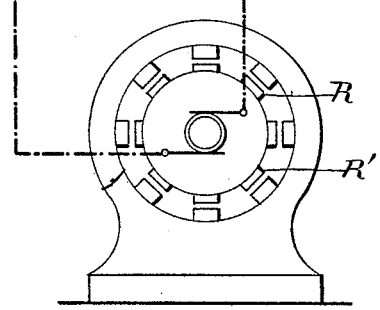
ATTEST:
J. A. Hurdle
J. F. Conrey
INVENTORS:
Hermann Lemp
Walter S. Moody
by H. L. Townsend
Attorney (No Model.)  H. LEMP & W. S. MOODY.  3 Sheets—Sheet 3.
PROCESS OF ELECTRIC METAL WORKING.
No. 523,986.  Patented Aug. 7, 1894.
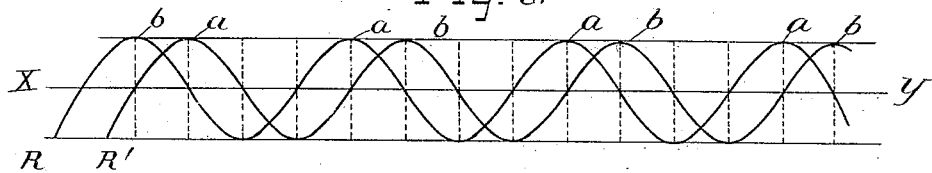
Fig. 8.
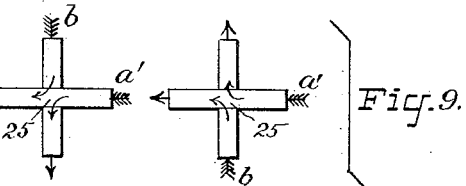
Fig. 9.
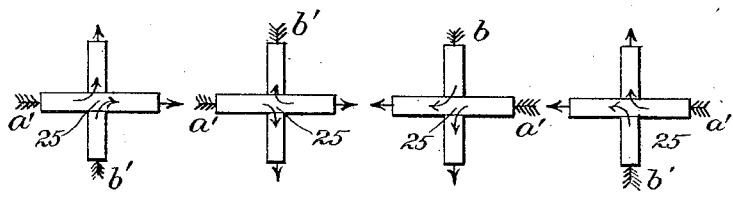
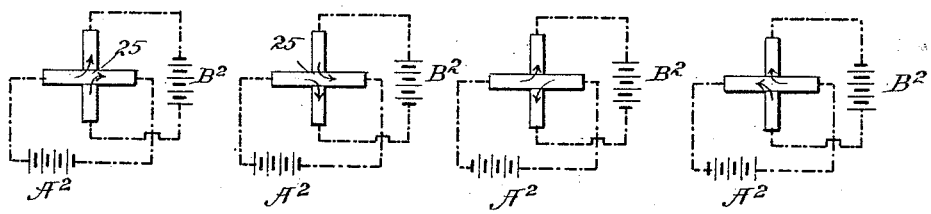
Fig. 10.
ATTEST:
J. A. Hurdle
J. F. Conrey
INVENTORS:
Hermann Lemp
Walter S. Moody
By H. C. Townsend
Attorney

UNITED STATES PATENT OFFICE.

HERMANN LEMP, OF LYNN, AND WALTER S. MOODY, OF CHELSEA, MASSACHUSETTS, ASSIGNORS TO THE THOMSON ELECTRIC WELDING COMPANY, OF MAINE.

PROCESS OF ELECTRIC METAL-WORKING.

SPECIFICATION forming part of Letters Patent No. 523,986, dated August 7, 1894.

Application filed October 20, 1890. Serial No. 368,695. (No specimens.)

*To all whom it may concern:*

Be it known that we, HERMANN LEMP, of Lynn, in the county of Essex, and WALTER S. MOODY, of Chelsea, in the county of Suffolk, State of Massachusetts, citizens of the United States, have invented a certain new and useful Process of Electric Metal-Working, of which the following is a specification.

Our invention relates to improvements in those methods and apparatus for metal working wherein the metal is heated by subjecting it to the action of an electric current passed through it, and is especially applicable to processes of electric welding.

Our invention consists in special methods of preventing the localization of the heating currents or effects where the currents are introduced or passed through the material at an angle to one another, as hereinafter more fully described and claimed.

In the accompanying drawings:—Figure 1, is a general plan view of two sets of metal working clamps for an electric metal working apparatus arranged and combined in accordance with our invention. Fig. 2, shows a combination of transformers wherein the desired relations or combinations of work holding devices exist. Fig. 3, is a side elevation of a construction of transformer devised by us and specially suitable for practicing our invention when applied either to the formation of electrically welded angle joints, or when modified as shown in Fig. 4, to the formation of joints between two pieces of metal placed end to end. Fig. 5, illustrates in plan a modification in the construction of an apparatus wherein the materials to be welded may be subjected to the combined action of currents flowing through the material at the joint in lines transverse to one another. Fig. 6, illustrates an arrangement of apparatus that may be employed for furnishing two sets of alternating currents displaced in phase ninety degrees to be fed into or through the same work at an angle. Fig. 7, shows a similar arrangement for the same purpose. Figs. 8, 9 and 10, are diagrams illustrating the action of the currents of displaced phase in correcting the tendency to localization of effect at particular portions of the work traversed by them.

Referring to Fig. 1, A, A′, represent in plan view work holding clamps or devices which form the terminals of a source of heating currents of any desired character, and are provided with the usual clamps or other means for supporting the metal to be operated upon, and passing an electric current into or through the same when placed in position between them.

The devices shown are typical of any devices suitable for the purpose and may be indefinitely modified or varied in their mechanical and electrical construction without departing from our invention. It is sufficient for the purposes of our invention that they shall form opposite terminals or electrodes of the source which supplies current to them and shall be adapted to pass the electric current into or through the piece or pieces of metal supported or in position between them. In the present instance we have shown them as supporting a continuous bar or rod 7, which is to be heated at a point 25, for the purpose of permitting an angle joint to be formed at such point between said bar and one or more pieces of metal abutted against the sides of the same.

The work holding devices A, A′, may be provided with suitable means for moving them or for moving the work upon them in a direction parallel to the line connecting the clamps or work holders or they may be fixed under all conditions according to the nature of the work to be done. In Fig. 3, where we have shown them as supplied with current from the secondary of a transformer, they are shown or indicated as fixed in position while in Fig. 4, they are shown as provided with means for moving them in the operation of welding two pieces mounted respectively in said holders.

B, B′, indicate two work holders of the same general character as already described and adapted to support or hold pieces of metal such as 5, 6. The parts of such work holders carrying the work may be provided with operating screws 8, 9, by which they may be moved in a line toward one another. The work holders B, B′, are placed respectively at opposite sides of the line joining the holders A, A', and are likewise made to constitute the terminals of a source of current for heating any material in circuit between them.

In the present instance the apparatus is shown as applied to the formation of two angle or T-joints at opposite sides of the bar 7, the pieces to be joined to said bar to make the angle or T joints being the pieces 5, 6. Such pieces might, however, constitute simply the means for passing the current into the bar 7, so as to subject the same to the action of two currents, one passing through said bar from one holder A, to the opposite holder A', and the other passing through or into said bar either from the work holder B, or from the work holder B', or passing directly through said bar from one work holder B, to the other work holder B'.

The two sets of work holders may be connected to the same source of power in multiple or in series with each other or to independent sources of power. In the present instance, we have shown the two work holders A, A', as connected to a source G, of continuous currents, and the work holders B, B', as connected to a source G'. With this arrangement, when the pieces 5, 6, abut against the bar 7, as shown, the bar will be heated quickly at the objective point 25, by the sum of the two currents flowing in it between A and A', and between B and B', and will be quickly raised to a welding temperature. The source of currents may be continuous or alternating, as desired, and of any desired character suitable for furnishing the currents of large volume but comparatively low electro-motive force desirable in metal working operations. When currents are passed as described and the pieces 5, 6, are to be welded to the piece 7, suitable pressure is applied so as to force the pieces 5, 6, against the sides of the bar and weld them to said bar, the parts in contact having been brought to the desired welding temperature by the passage of the two currents through the bar 7, to wit: one longitudinally through the same and the other transversely into or from it at its side at a point between the points of application of the first named current. The means shown for imparting movement to the work mounted in the holders B, B', may be also indefinitely varied in its mechanical details without departing from our invention.

When the two currents pass into or through the material at 25, in lines transverse or at an angle to one another there is a tendency to the localization of said currents or of the heating effects produced by them the heating being the greater from one corner of the area of contact to that diagonally opposite than elsewhere. This is due to the fact that the currents tend to set themselves parallel to one another, the current flowing from A to A', for instance, tending to set itself parallel to the current flowing from B to B'. Looked at from a different point of view the tendency to localization may be said to be due to the fact that the current flows or tends to flow from A to B', through the work, through the source of currents G, back to the holder B, and thence through the holder A', to the source G, and to the holder A, again, thus putting the two currents in series and causing the heating to take place on diagonal or inclined lines through the objective portion 25, of the bar 7. This phenomenon will be noted when the currents employed are either continuous currents or alternating currents which are in phase with one another. To obviate this difficulty and to distribute the heat more evenly, we propose to periodically reverse the direction of the two currents with relation to one another which may be readily done by simply interposing a reversing switch in one of the circuits. Thus for instance as shown in the drawings, a reversing switch as indicated at H, in the circuit of the generator G', may be employed and may be operated periodically for the purpose mentioned.

While we have indicated in Fig. 1, the use of currents which are continuous, it is very desirable to employ for one circuit a continuous current and for the other a current derived from any usual alternating current source so that the reversals instead of being produced by means of a switch H, will originate in the generator and the rectification of the tendency to localization of heating effects due to the tendency of the currents to put themselves parallel will be automatically secured.

It is preferable to put the several work holders in direct electrical connection with the secondary bar of the usual transformer employed in welding operations. An arrangement or combination of transformers which enables this to be done and to preserve the general relative arrangement or combination of the work holders is indicated in Fig. 2, where S, indicates the secondary bar or conductor of one transformer and $S^2$, the secondary bar or conductor of the other. These transformers might be of the general type described in the patent of Hermann Lemp, No. 428,618, dated May 27, 1890. The poles or terminals of the secondaries are arranged as shown with the opposite poles or terminals of one located at opposite sides of the line joining the poles or terminals of the other, and work holders are mounted upon said poles or terminals in any proper manner, suitable provision being made for moving those holders which it is necessary to move in the metal working operation. The primary of one transformer is typified at 10, and that of the other at 11. It is obvious that this construction permits the production of two angle joints simultaneously at opposite sides of a bar or rod held between two work holders of opposite polarity, or that a single angle joint may be formed, the bar or piece of metal at the opposite side of the continuous bar being used simply to convey current to the point where the joint is to be formed and being for such purpose modified in construction or mass, as desirable. We do not limit ourselves, however, to the employment of the apparatus shown for any particular kind of electric metal working operation.

The primaries 10, 11, are preferably fed from two sources of alternating currents with phases at or nearly ninety degrees apart. Such sources of alternating currents may be of any desired character, a convenient one being a dynamo having two armature windings so located with reference to one another as to produce such differences of phase in the currents fed to the two primaries. In the circuit of each primary is placed some device for regulating the current in such primary so that current flowing through the two parts of the work included in the circuits between the poles of the secondaries may be adjusted according to the resistance of the pieces of metal to produce the necessary or required temperature and cause the heavier pieces, or those requiring a greater current, to heat approximately as fast as those which, being of less conductivity for any cause, do not require so great a current.

The means for regulating the current in the primaries 10, 11, is herein indicated as a variable resistance at I, in the primary curcuit. Such resistance may be, and is preferably, a counter electro-motive-force resistance or self inductive resistance. The two means for varying the currents in the primaries are made adjustable independently of one another or adjustable in such way that the current in one primary may be increased while the current in the other remains stationary or is at the same time increased at a different rate or is at the same time decreased.

Fig. 6, illustrates the converters with their primaries supplied from a dynamo having two armature windings located to give the required difference of phase of ninety degrees. R, indicates one set of windings and R', another set applied to the armature in any usual or proper manner, but at proper positions thereon so that the currents delivered from the same as the armature revolves in the magnetic field will be displaced in phase ninety degrees. One set of armature windings is connected through the usual collector rings with the primary 11, and the other with the primary 10. Other arrangements might be used for the same purpose such, for instance, as that indicated in Fig. 7, where two armatures and fields are shown, the fields being displaced in position but the armatures having their coils arranged in the same relative position so that they will come into juxtaposition with the field magnets, one after the other, to produce the required difference in phase. It will of course be understood that in this case some means should be employed to preserve the relative position of the two sets of armature coils as, for instance, by mounting the two armatures on the same shaft. This diagram also shows that the work to be heated by the two currents might be traversed by alternating currents taken directly from the armature or armature coils as hereinbefore intimated.

The manner in which the work tends to heat on diagonal or inclined lines at the objective point 25, when the said points are traversed by currents from two sources and the way in which the use of alternating currents displaced in phase corrects this tendency will be more clearly understood from the diagrams Figs. 8, 9 and 10.

When the work is supplied from two sources of current it is obvious that, as before explained, one source will tend to put itself in series with the other as the current from the positive terminal of the one will tend to flow to the negative terminal of the other. Thus, for instance, taking the left hand diagram Fig. 10, wherein the two sources are typified at $A^2$, $B^2$, the current will pass from the positive pole of $A^2$, to the negative of $B^2$, and from the positive of $B^2$, back to the negative of $A^2$, the current passing through the medium at point 25, on the lines indicated by the small arrow. The result will be a tendency to cause the heating to localize on the diagonal or inclined lines. If the potential of the two sources were the same practically the whole of the current would flow in the direction indicated, but this tendency to flow would obviously be modified by the relation of potentials or electro motive forces of the two sources, and if the electro motive force of one source as $A^2$, were very much greater than that of $B^2$, then the greater part of the current of $A^2$, would flow directly from one pole to the other thereof through the piece A. Similarly if the source $B^2$, had the greater electro motive force there would be a tendency to the flow of current directly from one pole to the other thereof. If now the two sources alternated in their superiority of their electro motive force there would be less of a tendency to the localization of heating on the diagonal lines because the current would tend to pass first directly through the piece $A^2$, from one terminal to the other of the one source and then immediately afterward would pass in a greater amount directly from one terminal to the other of the source $B^2$. It will be readily seen also that a freedom from the tendency to localization of the heating will be more nearly attained the greater the difference of electro motive force of the two sources with each alternation in superiority. Such alternation of superiority is practically what would take place if alternating currents differing in phase ninety degrees were supplied respectively from the two sources $A^2$, $B^2$, the current of one source being practically at maximum intensity while the current of the other is at zero which would be practically the same thing as sending a current directly through the one piece A, or through the medium to be heated in one direction from one source with no current passing through the medium from the other source and at the next instant sending the current through the same medium by the other path from the latter source with none from the first. We would therefore have a practical effect equivalent to first using one source and then the other.

In the case of an alternating current source of the usual kind the tendency of the more active source to shunt through the inactive one would be prevented by the reaction or kick in the latter.

In the diagram Fig. 8, we have indicated diagrammatically two alternating waves displaced in phase ninety degrees or one quarter of a wave length, the wave $a$, indicating that produced say by the generator R′, and the wave $b$, that produced by the generator R while during the more active condition of the two sources there will be an action which, as just described, would be equivalent to passing current first from one source and then from the other. There will also be times when both sources will be active and bear certain relations of polarity to one another which will result in a tendency to heating on diagonal lines. These relations of polarity will change with every quarter of a wave length, but the tendency to localization of heating on two diagonal lines only, such as indicated in the left hand diagram Fig. 10, will be corrected owing to the fact that the tendency will shift to diametrically opposite diagonal lines, such as indicated in the second of the diagrams in Fig. 10. At each quarter phase in which there is a tendency to such flow of current there will be a shifting of the lines of flow to opposite diagonal or inclined lines, and in order to elucidate the matter more fully, we have indicated in Fig. 9, the condition in each quarter phase through two whole wave lengths, the wave $a$, Fig. 8, being taken as a basis. The vertical lines are used to indicate the several quarter phases.

In Fig. 9, the directions of the current represented by waves $a$, $b$, at the several quarter phases are shown by the direction of the arrows $a'$, $b'$. As will be seen the tendency of the current will be to flow alternately first across two diagonally opposite corners and then at the next quarter of the wave length, to flow at the two diametrically opposite points owing to the fact that the two sets of alternating currents tend to place themselves in series as before explained.

The condition at each quarter of one whole wave length is indicated in a different manner in Fig. 10, each source of alternating current being typified as a battery $A^2$, $B^2$, the connection of whose poles to the work is changed or reversed correspondingly with the change in the direction of the alternating currents represented by the two wave lines $a$, $b$, Fig. 8, wherein the line X, Y, represents the zero line or line of reversal of each alternating current.

We do not limit ourselves to any particular source of the alternating or reversed currents employed though for obvious reasons we prefer to employ what is ordinarily termed an alternating current dynamo as the prime source and using the alternations either directly or by conversion.

It is also obvious that our invention is not limited to any particular speed or rate of alternations or reversals in the two currents.

Fig. 3, shows a construction of transformer that is especially convenient in supplying two currents which are regulable according to the differences of conductivity in the work or parts thereof either in the formation of T or angle joints, or, by suitable modifications in the construction, in the formation of the usual welded joints between two pieces of metal placed in line. S, is the secondary bar or conductor of the transformer which, at an intermediate portion of its length as at W, has a pole adapted for connection with the work and constituting through the application of inducing primary coils at opposite sides of such intermediate portion, a point of division in a source of electric energy the opposite poles of which are connected to the work holders A, A′, so as to pass a current directly from one to the other of said holders. The inducing primaries and the usual or proper iron cores are indicated at 12, 13, and are applied to said bar or conductor S, in proper manner to induce secondary currents in the same direction which will flow in series from one to the other terminal of the secondary bar. The manner of applying the coils and iron, we do not describe more in detail as it may be varied without departing from our invention.

At 21, is indicated a bar or piece of metal placed between the terminals of the secondary S, and heated by the passage of current from one terminal or work holder to the other.

In the use of the apparatus described for forming a T joint by welding the piece of metal 20 to the side of the bar 21, the intermediate pole or projection W, of the secondary is provided with or is in electrical connection with a holder B, of any suitable construction mounted on or in electrical connection with the secondary. Such holder should be and is preferably provided also with means for forcing the piece 20, against the side of the piece 21.

Suitable means is provided for regulating the flow of current in each primary so as to vary the electro-motive force of each part or portion of the divided source of energy thus constituted according to the nature of the metal pieces to be operated upon. If the two primary currents are equal in the inducing coils the flow of the secondary current will be through the bar 21, from A to A′, entirely. By increasing, however, the effect of one or the other primary by means of the regulating apparatus, a greater or less amount of current may be made to flow through the intermediate pole which is connected by the piece 20 with the piece 21 and complete its circuit on whichever side of the source is given the higher potential. This adaptability for determining the side upon which the greater current shall flow is valuable in welding operations, as indicated in Fig. 4, and in other metal working operations. It will be seen that the current used to heat the bar 20, in the case of formation of a T joint, or for other purpose, should be small compared with that caused to pass through the bar 21. Otherwise the former current added to that passing from one terminal to the other will overheat that end of the bar 21, through which it flows. This tendency to overheating of one end we propose to rectify by using the regulating appliances so as to alternately increase the potential of the two sides of the divided source thus causing the greater current to flow first in one side and then in the other side of the bar 21. In the present instance the regulation will be effected by adjusting the resistance I, I, so as to cause first one and then the other to be the greater. The piece 20, it will be seen may be considered to be a piece of metal to be joined to 21, or be simply for passing current into the work between the holders A, A'.

In Fig. 4, the transformer is shown as provided with suitable attachments adapting it more particularly for use in welding two bars or pieces 23, 24, together end to end. The intermediate pole or terminal of the secondary S, carries one or more contacts L, which may be moved and placed in electrical connection with the pieces to be welded. When one of said pieces is larger than the other connection is made with the larger piece by means of a contact connected to the pole or projection from the secondary which constitutes a point of division of the source and the potential is increased on that end of the secondary bar which carries the larger piece or that requiring the greater current. Such piece is then heated by the combined action of the currents which flow respectively directly from one terminal of the secondary S, to the other by way of the holders A, A', and the current which flows through said larger piece and into or from the intermediate pole or projection of the secondary. A suitable regulation or adjustment of the flow of current in the primaries may be attained as before.

In Fig. 5, we have shown our invention as applied to the formation of a longitudinal joint between two bars, plates or rods of metal 27. The work holders A, A', hold said bars in position and furnish the current which flows longitudinally through the same while current is passed at the same time transversely through said bars at a part of the same between the holders A, A', where the weld or joint is to be effected by means of contacts B, B', which in the present instance perform the same function in supplying current to the work that the work holders B, B', do in other figures. The contacts B, B', are supplied with current in suitable volume from any source and are pressed into contact with the bar so as to form electrical connection therewith. The welding or other pressure which would be used in the formation of a longitudinal joint, in the case illustrated, may be applied by means of the blocks or pieces B, B', such blocks in such case performing a two-fold function of contacts and of pressure blanks. The form of the pressure surfaces of B, B', might obviously be conformed to a particular shape to be produced in the work that is held between the terminals or work holders A, A', and the same devices illustrated in Fig. 5, would be obviously applicable to other kinds of metal working besides electric welding, as for instance, to forging or shaping of a piece or rod of metal placed between the holders A, A', B, B'.

The special method of correcting the tendency to localization of effects, as hereinbefore described, consisting in periodically reversing the direction of the currents with relation to one another and the combination in an electric metal working apparatus of means for supplying continuous current to one part of the work and an alternating current passed through the same part of the work at an angle to the continuous currents are not herein claimed but form the subject of claims in another application for patent filed by us April 23, 1891, Serial No. 390,204.

The special construction of apparatus designed for carrying out our invention and illustrated in Figs. 3 and 4, as well as the method of electric metal working consisting in heating the work in part by current passed from one terminal to the other of a divided source of energy and in part by current through a connection to an intermediate point of said source, are also the subject of other applications for patents filed by us May 26, 1891, Serial Nos. 394,214 and 394,215, and are, therefore, not specifically claimed herein.

What we claim as our invention is—

1. The combination with transformers having their opposite poles arranged respectively on intersecting lines, of means for supplying the primaries of said transformers respectively with currents differing in phase.

2. The herein described improvement in electrically heating a piece of metal, consisting in feeding to the same two sets of heating electric currents flowing at an angle to one another in the work and differing or displaced in phase approximately ninety degrees.

3. The herein described method of correcting the tendency to localization of effect from two electric currents made to flow through the same medium, consisting in producing alternations of each current differing in phase approximately ninety degrees.

4. The herein described method of correcting the tendency to localization of effect in a circuit or conductor traversed by two alternating currents flowing through the same at an angle, consisting in giving to said currents a displacement of phase of approximately ninety degrees.

5. The herein described method of correcting the tendency to localization of effect in an electric conductor subjected to the action of two electric currents passed into or through the same at an angle, consisting in giving to said currents alternations or reversals displaced in phase with relation to one another approximately ninety degrees.

6. The herein described improvement in forming an angle or T, joint between two pieces of metal consisting in passing through the work two alternating currents at an angle to one another, said currents being displaced in phase approximately ninety degrees.

7. The herein described improvement in electrically uniting one piece of metal to another at an angle, consisting in passing an alternating current from any source through the continuous piece, and an alternating current displaced in phase ninety degrees into said continuous piece across the joint.

Signed at Lynn, in the county of Essex and State of Massachusetts, this 18th day of October, A. D. 1890.

HERMANN LEMP.
WALTER S. MOODY.

Witnesses:
JOHN W. GIBBONEY,
J. PARKER B. FISKE.